United States Patent
Harrington (10) Patent No.: US 6,400,467 B1
(45) Date of Patent: Jun. 4, 2002

(54) METHOD AND APPARATUS FOR RENDERING HALFTONE AREAS OF AN IMAGE WITH CONTINUOUS BOUNDARIES

(75) Inventor: Steven J. Harrington, Holley, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/554,395

(22) Filed: Nov. 6, 1995

Related U.S. Application Data (63) Continuation of application No. 08/169,878, filed on Dec. 17, 1993.

(51) Int. Cl.$^7$ .............................................. G06F 15/00
(52) U.S. Cl. ...................................... 358/1.9; 358/3.27
(58) Field of Search ................................ 395/101, 109, 395/114, 128, 129, 131, 132; 358/515, 518, 520, 532, 547, 3.27; 382/270, 254, 162, 199

(56) References Cited

U.S. PATENT DOCUMENTS

| | | | |
|---|---|---|---|
| 5,153,576 A | 10/1992 | Harrington | 345/596 |
| 5,225,911 A | 7/1993 | Buckley et al. | 358/296 |

OTHER PUBLICATIONS

Color Encoding Standard Xerox System Integration Standart, Xerox Corp. Palo Alto, California, Jul. 1991 XNSS 289107 ("The Xerox Color Encoding Standard").

*Primary Examiner*—Gabriel Garcia
(74) *Attorney, Agent, or Firm*—Thomas B. Zell; Duane C. Basch (57) ABSTRACT

A method and apparatus are disclosed for locating and coloring true boundaries of image elements forming a color image defined with colors having one or more color separations. Once a boundary of an image element is located and determined to be a true boundary of the color image, the original color of the image element boundary is mapped to a solid color so that ragged edges created when rendering certain colors are minimized when reproducing. the color image element.

21 Claims, 6 Drawing Sheets

METHOD AND APPARATUS FOR RENDERING HALFTONE AREAS OF AN IMAGE WITH CONTINUOUS BOUNDARIES

This is a continuation of application Ser. No. 08/169,878, filed Dec. 17, 1993.

The present application is related to the co-pending U.S. patent application Ser. No. 08/168,444 entitled "Color Mapping To Preserve Detail", filed concurrently herewith.

The present invention relates generally to a document processing system equipped with user invokable mapping that minimizes the formation of ragged edges around image elements, and more particularly to a method of locating the boundaries of the image elements and mapping their original colors or textures to solid colors.

BACKGROUND OF THE INVENTION

Color document processing systems typically include an input device such as a computer workstation that is equipped with document applications for creating, editing and storing electronic documents and an output device such as a printing system for rendering documents. The computer workstation is operated by a user to create, edit or view "softcopy" color images on the. color monitor of the workstation. The user can subsequently generate "hardcopy" reproductions of the softcopy images by instructing the workstation to provide the processed electronic image to a selected color printing device. Current advances in color printing technology are helping color document processing systems become more pervasive in desk-top publishing and business applications. Ink jet, thermal-transfer and xerographic color are examples of printing technologies that are making moderate resolution color affordable for these applications. Although more affordable, these printing technologies have some limitations which may surprise and disappoint a user.

Electronic images processed by the workstation consists of a two dimensional array of picture elements (pixels). The color of each pixel may be represented in any of a variety of color notations or color spaces. The colors of softcopy color images are typically defined using a device dependent color classification space such as the additive red, green and blue (RGB) phosphor color space. More specifically, each pixel of the monitor's display contains three primary color phosphors. To generate a color defined by a set of RGB values, the monitor stimulates each primary phosphor with an intensity determined by the corresponding R, G, B value. To be printed, these images need to be converted to the subtractive cyan, magenta, yellow and black (CMYK) or (simply the CMY) color space, which is typically used to put colored dyes, inks, or toners on paper.

Document processing systems typically contain predetermined transform definitions for converting an image defined in one color space to another color space. These transformations are typically defined using a look up table (LUT), that enables a color to be readily mapped from one space to another. Accordingly, the color of each pixel of an electronic image is sequentially mapped using a LUT transform definition to yield a hardcopy representation of a softcopy image. To perform other image transformations that perform functions to enhance or sharpen a color, the system remaps the color values to yet another point in accordance with another transform definition. Any number of transformations can thus be performed by sequentially mapping color values according to the available predetermined transform definitions.

Transformations used to convert softcopy images to hardcopy images, however, are limited by the color gamuts afforded to softcopy displays and to hardcopy reproduction systems. For example, because of physical limitations of a printing system, such as its resolution, a softcopy of a color image may lose detail when reproduced as a hardcopy. Since the hardcopy reproduction may not have sufficient resolution to reproduce a softcopy image exactly as represented on a color monitor, the printing system may sacrifice appearance detail of a softcopy image in order to preserve its color fidelity. One instance of this limitation is the production of fine lines and text for certain colors. Unlike CRT displays that tend to have many intermediate color shades, most printing technologies are binary in nature, marking with either full ink or none at all. These printing technologies consequently reproduce intermediate shades and tints with a halftone pattern of solid dots. Thus, when a fine line is drawn using such a dot pattern, gaps or stripes in the line may result. For example, small text may have its boundary so disrupted by a halftone dot pattern that the hardcopy rendering of it may be illegible.

In addition to color printing systems, black-and-white printers that render colored documents using colors that are mapped to certain texture patterns also have a tendency to lose detail when rendering text or fine line graphics specified with a color mapped to a texture. For example, U.S. Pat. No. 5,153,576 to Harrington, provides a halftone-like method for automatically generating texture patterns for image elements by operating on an image, pixel-by-pixel, to produce a pattern for a specified color. Since these generated patterns must have a texture coarse enough to be seen and to be distinguishable from other patterns, the generated patterns have a tendency to introduce some degree of raggedness to the edges of the colored objects that they specify.

Since color printing is performed using a gamut of colors that includes tints and shades of the full color spectrum (e.g. reds, greens, blues and their combinations), printing colored text or fine line graphics on a moderate resolution printing system is difficult for all but a few solid colors. Thus because of physical device limitations, such as a printing system's resolution, many softcopy color images are inadequately rendered as hardcopy. Specifically, there exists many colors for which lines and text look fine as softcopy on a CRT display but are unacceptable when printed as hardcopy on intermediate resolution printing systems. There exists therefore a need to provide image transformations or mappings that preserve the appearance detail of softcopy images apparent when displayed on color monitors and lost when reproduced as hardcopy on color printing systems. Text, for example, is useless if not legible. Consequently, these transformations should go so far as to sacrifice the color fidelity of the text in order to insure that its appearance detail is preserved.

By way of background, communication protocols between devices such as workstations and printing systems are well known. Some of these protocols define how systems should integrate across networks to provide users with an environment for color document processing. In such environment communication between devices is transparent to users as a result of the various network protocols that define the manner in which devices exchange information. Specifically, document processing systems can be integrated using Ethernet™ and the Xerox Network Systems Communication Protocols which include: Internet Transport Protocols: Xerox System Integration Standard, Xerox Corp., Stamford, Conn., December 1981, XSIS-028112; Courier: The Remote Procedure Call Protocol, Xerox System Integration Standard, Xerox Corp., Stamford, Conn., December 1981, XSIS-038112; Clearinghouse Protocol, Xerox Corp., Stamford, Conn., April 1984, XSIS-078404; Authentication Protocol, Xerox Corp., Stamford, Conn., April 1984, XSIS-098404; and Filing Protocol, Xerox Corp., Stamford, Conn., May 1986, XNSS-108605.

Also, protocols establishing how to encode electronic documents for transmission between various workstations and printing systems using communications protocols is well known. For example, documents can be encoded using a page description languages (PDL) such as Interpress™ as disclosed in "Interpress™: The Source Book", Simon & Schuster, Inc., New York, N.Y., 1988, by Harrington and Buckley. In combination with Interpress, the Color Encoding Standard, Xerox System Integration Standard, Xerox Corp, Palo Alto, Calif., July 1991, XNSS 289107 ("The Xerox Color Encoding Standard"), provides a standard for interchanging electronic color documents among document applications and devices. The Xerox Color Encoding Standard describes three reference color systems that attempt to provide device independent color between devices such as workstations and printers.

As described above, many factors, such as resolution, affect the true appearance of an image rendered by different physical devices. Consequently, The Xerox Color Encoding Standard, suggests using "appearance hints", in addition to a reference color system. Appearance hints provide additional information when describing a color. In particular, one appearance hint provides an ability to indicate that, when reproducing an image, it is more important to a user that the detail of the image is reproduced than its original color fidelity. Co-pending U.S. patent application Ser. No. 08/168,444 entitled "Color Mapping To Preserve Detail", filed Dec. 17, 1993 describes a method, that is prompted by an appearance hint, for preserving detail of an image element by mapping the original color of the image element to an alternative color which appears solid when printed.

All references cited in this specification, and their references, are incorporated by reference herein where appropriate for appropriate teachings of additional or alternative details, features, and/or technical background.

SUMMARY OF THE INVENTION

In accordance with one aspect of the present invention there is provided a method for mapping an original color of an image element boundary to a color that appears solid when reproduced. The original color and the color that appears solid being defined by a plurality of color separations. The method includes the steps of locating a section of the image element boundary, and determining whether the image element boundary section located in the locating step forms a true boundary section of the color image. Subsequently, a color separation of the image element boundary section is mapped to a solid color in response to the selection of the image element boundary being a true boundary section. The mapping preserving edge detail in the image element being reproduced.

In accordance with another aspect of the invention there is provided an apparatus for mapping an original color of an image element boundary to a color that appears solid when reproduced. The original color and the color that appears solid being defined by a plurality of color separations, The apparatus includes means for locating a section of the image element boundary, and means for determining whether the image element boundary section located by the locating means forms a true boundary section of the color image. Subsequently, means map a color separation of the image element boundary section to a solid color in response to the selection of the image element boundary being a true boundary section, to preserve edge detail in the image element being reproduced.

In accordance with yet another aspect of the present invention there is provided a method for mapping original colors of image object boundaries forming an image to colors that appear solid when reproduced. An image object being defined by a set of pixels that represent one or more image elements having boundaries with a color defined by a plurality of colorants. The method including the steps of locating a boundary pixel forming an image element, locating a companion pixel adjacent to the boundary pixel and external thereto, calculating a difference value for each colorant defining the boundary pixel and the companion pixel, determining whether the difference value for each colorant exceeds a threshold value, the determining step indicating that the boundary pixel and the companion pixel are true boundary pixels of the image object in response to the difference value of a colorant exceeding the threshold value, and maximizing the larger of the colorants defining, the true boundary pixels.

BRIEF DESCRIPTION OF THE DRAWINGS

These and other aspects of the invention will become apparent from the following descriptions, illustrating a preferred embodiment of the invention, read in conjunction with the accompanying drawings wherein the same reference numerals have been applied to like parts and in which.

DETAILED DESCRIPTION

A. Document Processing System

Figure 1:
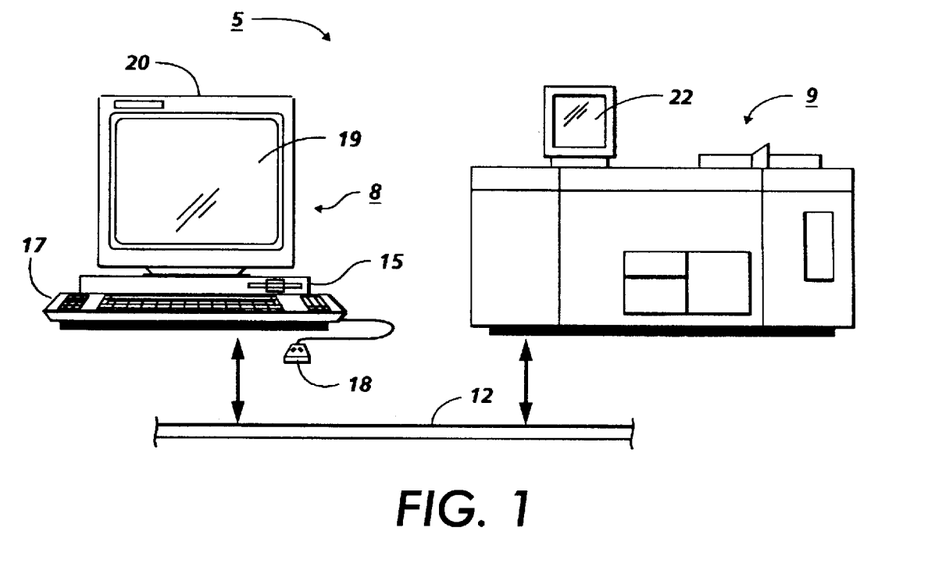
FIG. 1 is a schematic elevational view depicting one example of components of an electronic document processing system with a color printing machine adapted to print electronically encoded documents transmitted from a computer workstation.

With reference now to the drawings where the showings are for the purpose of illustrating a preferred embodiment of the invention and not for limiting same, FIG. 1 shows electronic document processing system 5 incorporating the present invention. The electronic document processing system 5 includes a color computer workstation 8 and a color printing system 9 that are connected with a suitable communication channel such as EtherNet® connection 12. The connection 12 enables image data from one or more remote sources such as workstation 8, to be input to the printing system 9 for hardcopy rendering. The workstation 8 includes a computer system 15 for processing user inputs received from keyboard 17 and pointing device or mouse 18, through user interface 19 displayed on color monitor 20. The user interface 19 collectively represents user inputs through which control instructions are used to develop color electronic images. The color printing system 9, which has its own user interface 22 for monitoring print job requests, is adapted to print hardcopy color image renderings of selected electronic images developed on workstation 8.

Figure 2:
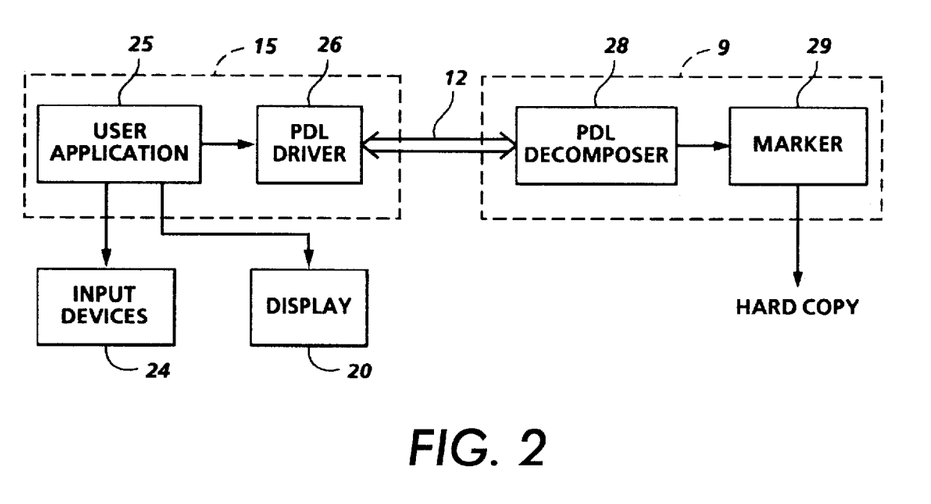
FIG. 2 is a block diagram illustrating the principal elements of the electronic document processing system shown in FIG. 1.

FIG. 2 shows a block diagram representing the basic elements of the electronic processing system 5 shown in FIG. 1 required for carrying out the present invention. In particular, the computer system 15 of workstation 8 executes a conventional graphical user application 25 such as "GlobalView®" developed by the Xerox Corporation. User application 25 provides a high level, device independent graphics software environment for creating, editing and viewing high quality electronic images using two dimensional image elements. Examples of image elements are text in various fonts, lines and curves of various thicknesses, strokes or enclosed outlines and sampled images, all of which can be depicted using various colors that are represented by color reference models as disclosed the Xerox Color Encoding Standard. Image elements are typically a high level description of pixels (picture elements), and unlike pixels, image elements are inherently device independent and are therefore readily transferable between various input and output devices. Additionally, the user application 25 can scale, rotate, translate and clip image elements by specifying an image transformation along with an element. The device independent specification of electronic images by application 25 enables electronic images specified in this manner to be rendered on a variety of output devices such as color printing system 9.

More specifically, image elements forming an input image emitted from PDL driver 26 are defined using high level primitives of a page description language (PDL) such as Interpress used by Xerox® Corporation. Other examples of PALS are Postscript® ("PS") which is described in "PostScript® Language Reference Manual", Second Edition, Addison-Wesley Publishing Co., 1990, and Hewlett Packard Printer Control Language ("HP-PCL") which is described in "PCL 5 Printer Language Technical Reference Manual", First Edition, Hewlett Packard Co., 1990. In general, a PDL provides a set of commands that are used to describe various graphic and textual elements forming an image to be printed. For example, a PDL can describe a rectangle in an image by indicating coordinates of its corners, the thickness of its edges, its fill pattern, its color as well as other attributes. The PDL can also be used to include in the input image a raster image or a reference to one or more raster images. The high level primitives describing the input image form a PDL stream of data that is rendered to lower level primitives such as pixels. Each pixel corresponds to a spot which is subsequently marked using an image output terminal such as printing system 9 to form a reproduction of the input image.

Selected input images which are stored in the memory (not shown) of workstation 8 and described using a PDL by user application 25 are transmitted to printing system 9 using print driver 26. Print driver 26 transfers PDL descriptions of electronic document files selected for printing to printing system 9. Once received and stored in the memory (not shown) of printing system 9, PDL descriptions of electronic documents are processed by PDL decomposer 28. The decomposer 28 produces corresponding color bytemapped image files of PDL descriptions of electronic documents that are subsequently rendered on paper or the like by marker 29. A functional implementation of the PDL decomposer 28, is described in detail in U.S. patent application Ser. No. 07/898,761 entitled "Apparatus and Method for Multi-Stage/Multi-Process Decomposing", filed Jun. 12, 1992, by Bonk etal., the pertinent portions of which are incorporated herein by reference. The decomposer 28 executes a PDL stream to generate lower level imaging primitives, and in doing this, the decomposer further parses the PDL stream into various image related components that are further processed by decomposer 28 before output to marker 29. The types of operations required to generate image related components include, among others, binding font calls to bitmap or contour fonts, image processing on pictorial information (such as rotating, enlarging and reducing), and/or converting line art/graphics to lower level primitives.

Figure 3:
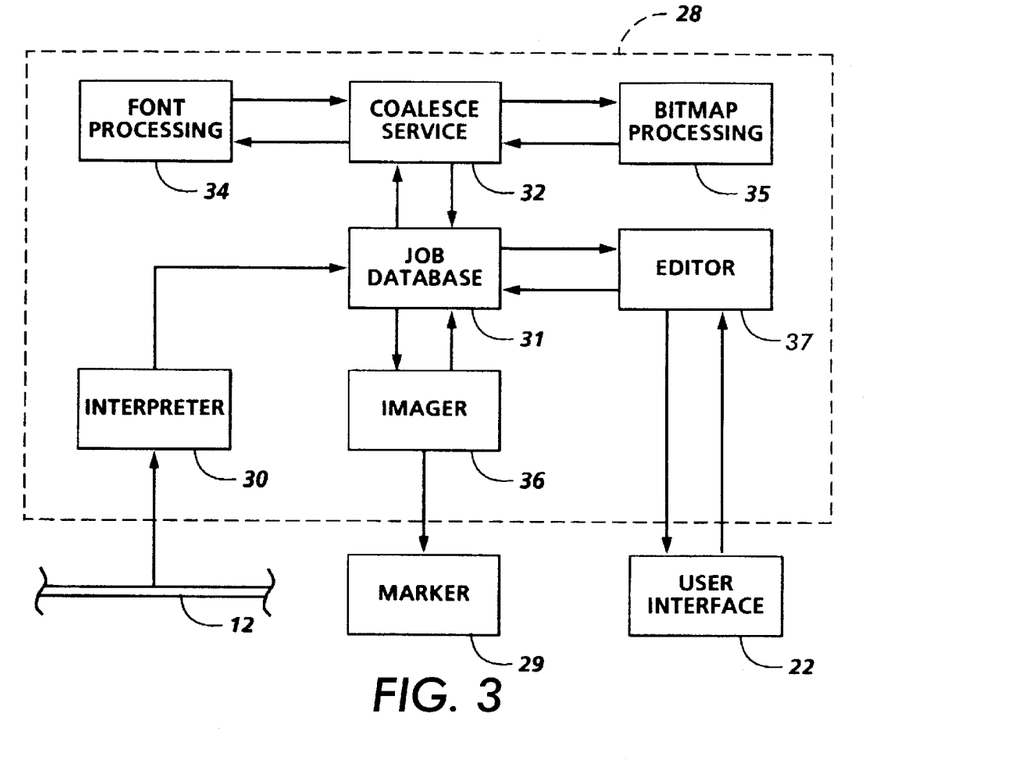
FIG. 3 is a block diagram illustrating the PDL decomposer shown in FIG. 2.

FIG. 3 shows a block diagram representing the major components of PDL decomposer 28. Briefly, decomposition is initiated when a PDL stream of image data is communicated through network connection 12 to the interpreter 30 of decomposer 28 after various elements of printing system 9 are appropriately coordinated. Interpreter 30 then parses the PDL stream into various image related components that are subsequently stored in the job database 31 and later referenced using identifiers. The identifiers of job components are passed from the interpreter 30 to the coalesce service 32 for font processing 34 and bitmap processing 35. Coalesced information is then imaged by imager 36 to bits which are transmitted to marker 29 to be rendered on paper. Additionally, coalesced information in database 31 can be edited using editor 37 through user interface 22 prior to transmission to marker 29.

Figure 4:
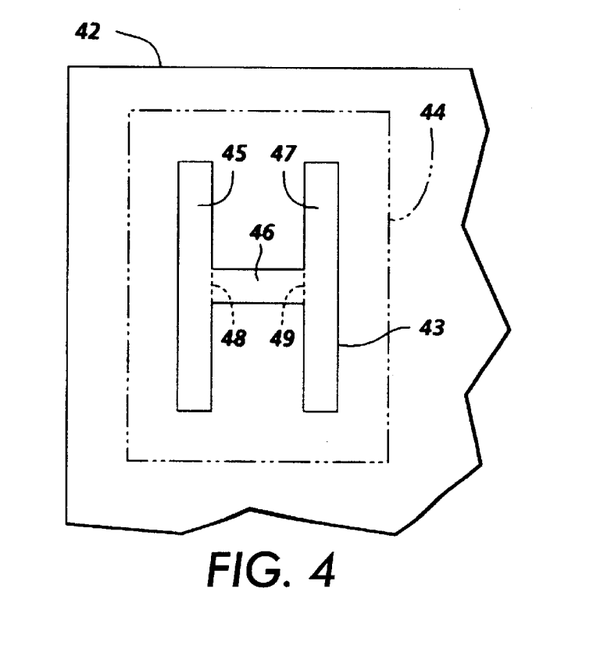
FIG. 4 is one example of a fragment of an image having image elements.

FIG. 4 shows an example of image elements that can be generated electronically using workstation 8. Character 43 and background area 44 are fragments of image 42 that can be represented by high level primitives using a PDL. The image elements have associated with them a set of properties that describe their various attributes. Specifically, the workstation 8 presents the attributes for a character and its background using the text property sheet 50 shown in FIG. 5. For example the character "H" shown in FIG. 4 is described by a font which is specified by a family, a typeface, a size, a weight (e.g. bold) and a stress (e.g. italic). The character "H" and the background 44 of character "H" are also individually described by a color as depicted by "Text Color" and "Background Color" respectively. The text property sheet shown in FIG. 5 enables users creating electronic images to individually specify properties of each image primitive.

B. Device Independent Color

Representing a color in a device independent manner between an input and an output devices, such as workstation 8 and printing system 9, using color models is well known and does not form part of the present invention. A number of color reference models or systems have been developed some of which are described in the Xerox Color Encoding Standard. It will be assumed herein that the additive RGB color model used to describe an image element on monitor 20 can be readily encoded using a known reference color model and converted to the CMY subtractive model. For example, the Xerox/RGBLinear color model described in the Xerox Color Encoding Standard can be used to represent the color of image elements developed on workstation 8 for rendering on printing system 9. Specifying the color of a character using the character property sheet shown in FIG. 5 encodes the desired color of an image element using a color reference model.

Figure 5:
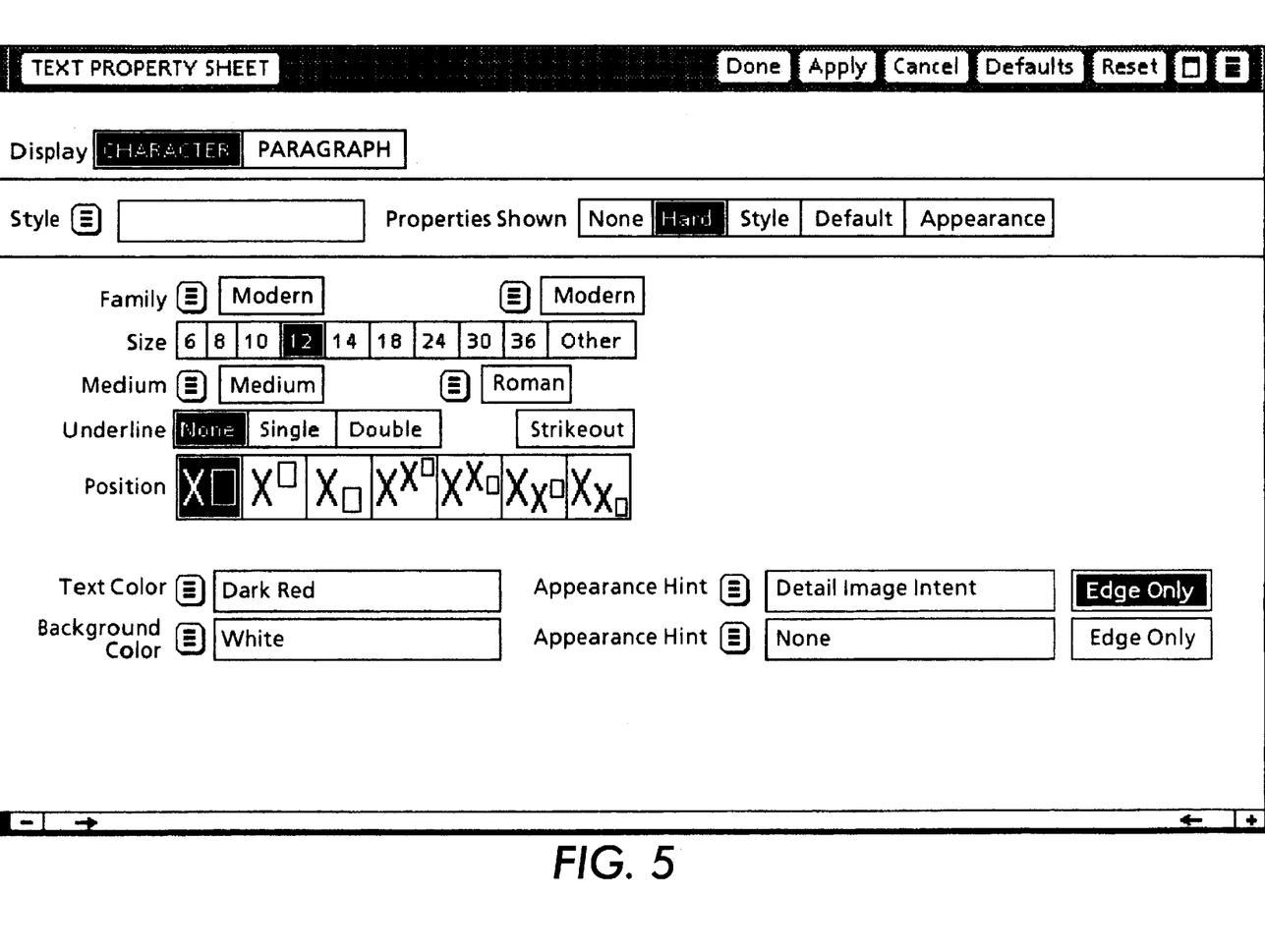
FIG. 5 is one example of a property sheet for the image elements shown in FIG. 4.

The character property sheet shown in FIG. 5 also provides appearance hints for conveying optional information that may be useful in reproducing the specified color of an image element. These appearance hints, which are described in detail in the Xerox Color Encoding Standard, enable users to specify the intent or the nature with which the color of each image element is specified. One such appearance hint is "image intent". For example, by specifying a "pictorial" image intent appearance hint the color of an image element is to appear realistic, while a "functional" image intent appearance hint indicates that an image element should distinguish its color from the color of other image elements. Specifying a "detail" image intent appearance hint, however, indicates that the fidelity of the color of an image element is not critical and that the specified color requires solid area coverage for comprehension. Accordingly, the detail image intent appearance hint can be used with image elements such as fine line graphics and text for example.

Depending on the printer, problems can arise when printing colored text and colored line art, since most printers use halftone patterns to create colors. For example, a light color is created by a scattering of small dark colored spots on a white background. For many images the eye integrates the spots and background into a uniform light color, but for text, for example, the scattered spots of a coarse halftone screen result in ragged edges on a character which can render it ugly and unreadable when printed. For readability, text should be printed in colors which are produced by forming a solid covering of ink. The set of solid colors depends upon the way a printer produces its colors and the gamut of colors it can produce. Some printers may be able to produce a solid form of the desired color while others cannot. It is therefore advantageous to tag colors with the detail image intent appearance hint, described above, to indicate that preserving the detail of an image element is more important than preserving its color fidelity. Thus, although the detail color mapping method provides uniform and very legible image elements, it may sacrifice color fidelity of the image elements.

With reference to the present invention, a method of mapping colors is provided that preserves edge or boundary detail of image elements such as fine line graphics and text that have a specified color which may suffer a loss of legibility when rendered on hardcopy by a printer. Accordingly, a detail image intent appearance hint is specified to indicate that color fidelity can. be sacrificed in order to preserve detail of the-specified image element. In addition to the detail image intent appearance hint, the "Edge Only" qualifier is specified, as shown in FIG. 5, to indicate that such sacrifices in color fidelity should occur at the boundaries of the image element only (e.g. text color), thereby providing greater color fidelity than a comprehensive color mapping of the entire image element. Thus, when specifying a detail image intent appearance hint with an edge only qualifier, the interior of an image element retains its original color while the edge or boundary of the specified image element is mapped to a solid color when printed.

In response to specifying a colored image element with a detail image intent appearance hint with an edge only qualifier, the printing system 9 renders boundaries of image elements with solid colors, thereby providing the specified image elements with crisp boundaries or edges and thus avoiding ragged edges resulting from textures formed by halftone patterns. In order not to vary unduly from an image element's. original color, the boundaries of the image element are rendered in a solid color which is close to the originally specified color. Printing system 9, like many other printers, produces colors with combinations of cyan, magenta and yellow (c,m,y) inks or colorants, where ideally the cyan ink removes red light, the magenta ink removes green light and the yellow ink removes blue light. Thus, to preserve edge detail of an image element described using (c,m,y) colorants, printing system 9 maps the original color of the image element with at least one primary of the (c,m,y) colorants. This edge detail mapping method makes the boundaries of the image element appear solid when rendered by printing system 9.

In general, a method of detail color mapping that preserves edge detail of an image element when printed is specified in accordance with the properties of a printing system and the method with which the printing system generates colors. An image element, such as text, will lose detail only when printed with certain colors; black text, for example, prints with adequate detail; gray text, however, causes difficulties. Similarly, colors such as solid cyan or solid magenta provide high quality lines and characters when printed. Thus, when every pixel forming an image element is set to a relatively dark color, such as black, cyan and magenta, the boundary between the image element and its background becomes clearly defined, making the image element very legible.

In some cases, however, boundaries of image elements, such as text, printed on a light background need not be limited to pure primary (e.g. cyan and magenta) colors in order for them to be legible. Against a non-cyan background, for example, a character printed in solid cyan with some additional amount of magenta or yellow or black is still quite legible because the cyan colorant provides a crisp, well defined boundary. The presence of other colorants scattered within a character's boundary alters its color by making it darker, they do not, however, provide enough contrast variation to harm a character's legibility. Thus, a character printed with a boundary in solid magenta with any amount of the other colorants provides good legibility. In other words, a dark color, described using cyan, magenta and yellow primaries as $(0 \ldots c \ldots 1, 0 \ldots m \ldots 1, 0 \ldots y \ldots 1)$, where the amount of each primary is defined from zero to one, is legible when 100% of the cyan (1, m, y) or 100% of the magenta (c, 1, y) component is present in the color.

In contrast, an image element defined using a solid yellow colorant on a light background is not sufficient by itself to provide adequate legibility, since the solid yellow colorant is too light and does not offer enough contrast on a light background. Light colorants such as yellow, therefore, only provide good legibility when seen against a dark background. Also in the case of light colors seen against a dark boundary, the presence of a cyan colorant or a magenta colorant harms legibility of an image element. A light color, described using cyan, magenta and yellow primaries as described above, is legible when some of a color's yellow component is present and its cyan and magenta components are absent (0,0,y). Thus, depending on the color of the image element and its background color, color mapping improves legibility and preserve detail by replacing the image element's original requested color with a legible color that is close to its original color.

C. Rendering Areas of an Image with Solid Boundaries

To carry out the edge detail color mapping of the present invention a color image is first created using workstation 8. The color image, which is displayed on monitor 20, is described electronically using image elements, such as text, that are stored in the memory (not shown) of user application 25 shown in FIG. 2. Each image element, such as text, forming the color image has a number of properties that describe the appearance of each image element. For example, some properties of a character are provided by the text property sheet shown in FIG. 5. In particular, the edge color appearance hint property provides optional information that describes how a perceived color at the monitor should appear when printed, in the event a printer may not be able to reproduce a specified color without altering the intended appearance (e.g. the legibility) of the text. In specifying the edge only detailed image intent appearance hint for an image element such as text, a printing system upon recognition of the appearance hint will alter, using the detail color mapping of the present invention, the originally selected color of the edge or boundary of the text (e.g. dark red) to another color that is close to the originally selected color to preserve the legibility of the text when printed. The originally selected color of the text, therefore, is not altered if the printing system is capable of reproducing that color while preserving image detail even though an edge only detail image intent appearance hint is specified.

Once the color image is fully characterized by user application 25 using image elements such as text, line art and bitmap, the image is encoded using image primitives of a PDL such as Interpress and transmitted to printing system 9 with print driver 26 to PDL decomposer 28 through connection 12 for hardcopy rendering on marker 29 as shown in FIG. 2. Upon receipt, the interpreter 30 of PDL decomposer 28 parses the image primitives of the PDL stream arriving through connection 12 as shown in FIG. 3. Each image primitive is stored in job database 31 by interpreter 30 before being imaged to bits by imager 36. In accordance with the present invention, some of the image primitives parsed are defined with edge only detail image intent appearance hints. These image elements are processed by PDL decomposer 28 according to the flow diagram shown in FIG. 6. At step 61, the interpreter 30 recognizes image primitives having colors with edge only detail image intent appearance hint instructions. These image primitives are stored in job database 31 as image components requiring "edge enhancement" by imager 36. After coalesce service 32 completes any required font processing 34 and bitmap processing 35 of image components, imager 36 receives the coalesced image information.

Figure 6:
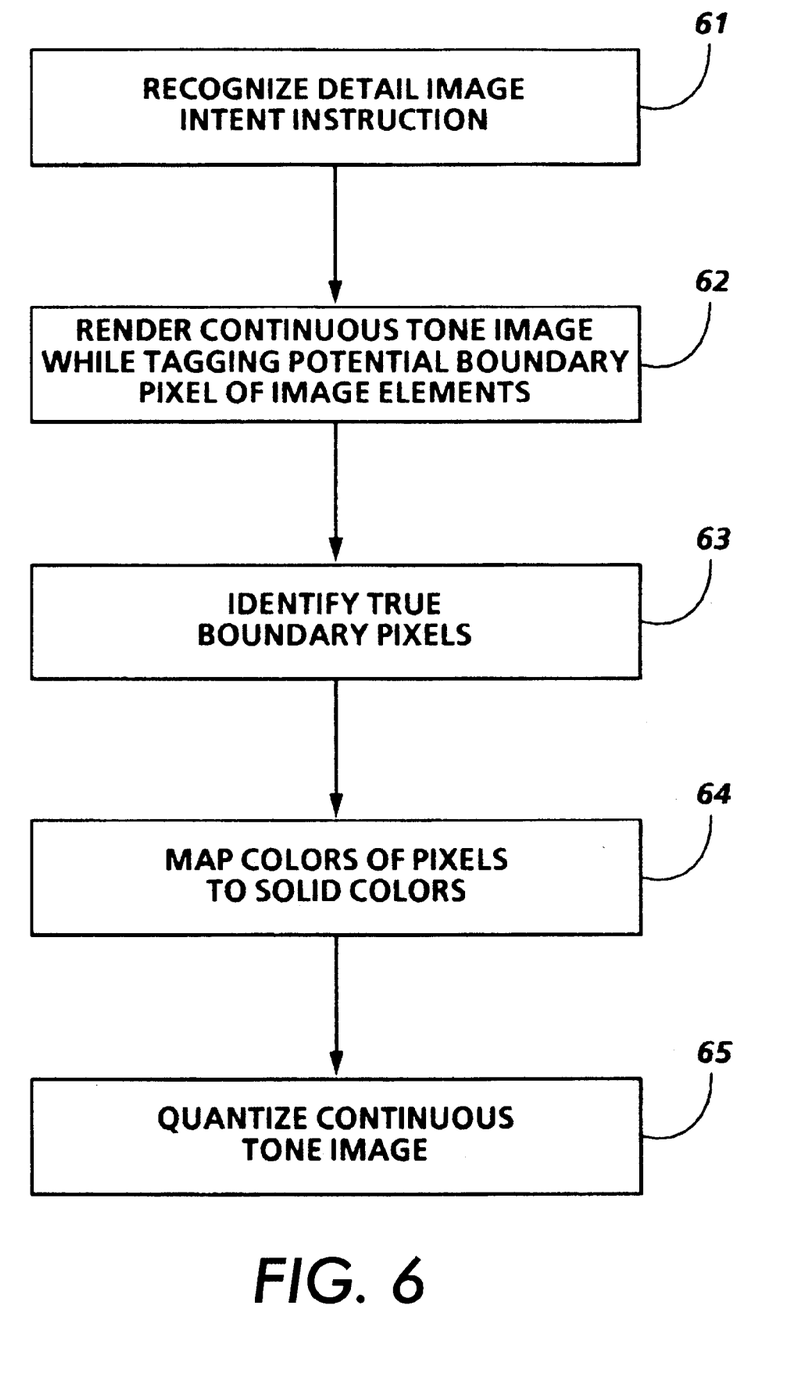
FIG. 6 is a flow diagram depicting the operation of rendering colored areas of image elements with solid boundaries in accordance with the present invention.

At step 62 in FIG. 6, imager 36 renders a full color continuous tone image from image components defined in job database 31. The continuous tone image is stored in an image buffer as a bytemap of pixels (picture elements). Each pixel has a value that represents its color described using multiple levels of cyan, magenta and yellow (c,m,y) colorants. In addition to each color value, provided along with each pixel, is a boundary indicator, specified by interpreter 30, to indicate when a pixel of an image component requires edge enhancement. The boundary indicator is specified for each pixel surrounding an image object such as a rectangle. At first glance it may appear straight forward to determine the boundary of an object encoded using high level PDL primitives, since such primitive graphical objects have readily definable boundaries.

Boundaries of the primitive objects, however, are not always the boundaries of the final visible object. For example, the letter "H", shown in FIG. 4, could be constructed by one complex boundary path 43 or by three simple rectangles 45, 46 and 47. If the letter "H" were constructed using three rectangles 45, 46 and 47, each having the same color, their boundaries 48 and 49 at which they join (illustrated using dashed lines) constitute false boundaries. If the full boundaries of the three rectangles 45, 46 and 47 were rendered using visible solid lines, then a hidden artificial structure would be revealed along dashed lines 48 and 49 with solid lines when printed after edge enhancement. Also care must be taken when determining a boundary of a slanted line. For example, pixels forming a slanted line can be compared with an ideal boundary passing through those pixels and any pixel whose center passes below or to the right of the slanted line can be considered boundary pixels. Alternatively, boundaries of different raster images such as text and line art can be determined while being merged as provided by U.S. Pat. No. 5,225,911 to Buckley et al., the pertinent portions of which are incorporated herein by reference.

Thus, while the image buffer is filled with continuous tone color pixels of a complete image at step 62, those pixels of image elements specified with edge only detail image appearance hints are tagged as boundary pixels. At step 63, the imager 36 determines which of the tagged pixels belong to the true boundaries of visible objects (i.e. those pixels that would not generate artificial structures as described above). Before a pixel is to be considered a true boundary pixel it must be tagged as a boundary of some primitive image element when rendered at step 62 and differ significantly from neighboring pixels outside of the primitive image element. To make this determination requires the full color specification of each pixel stored in the continuous tone image buffer and its boundary indicator. In effect, each pixel tagged as being part of a boundary must be compared with its companion or neighboring pixels to determine whether each pixel is a true boundary pixel. Subsequently, at step 64, those pixels determined at step 63 to be true boundary pixels are mapped to a solid color when rendered by marker 29. Specifically steps 63 and 64 shown in FIG. 6 are shown in detail in in FIGS. 7 and 8.

Figure 7:
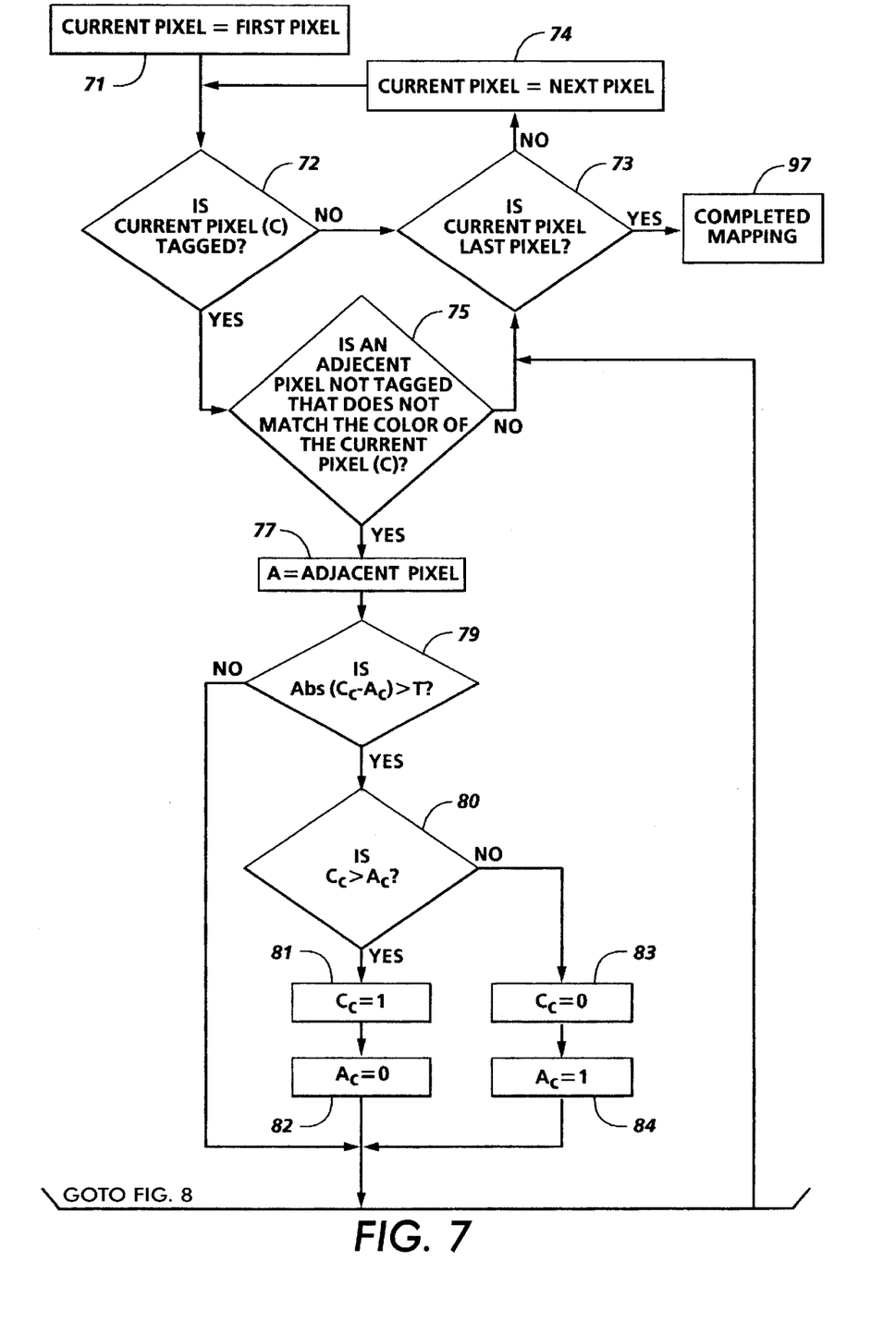
FIGS. 7 and 8 are a flow diagram depicting the mapping of boundaries of colored image elements defined using cyan, magenta and yellow colorants (c,m,y) in accordance with the present invention.
Figure 8:
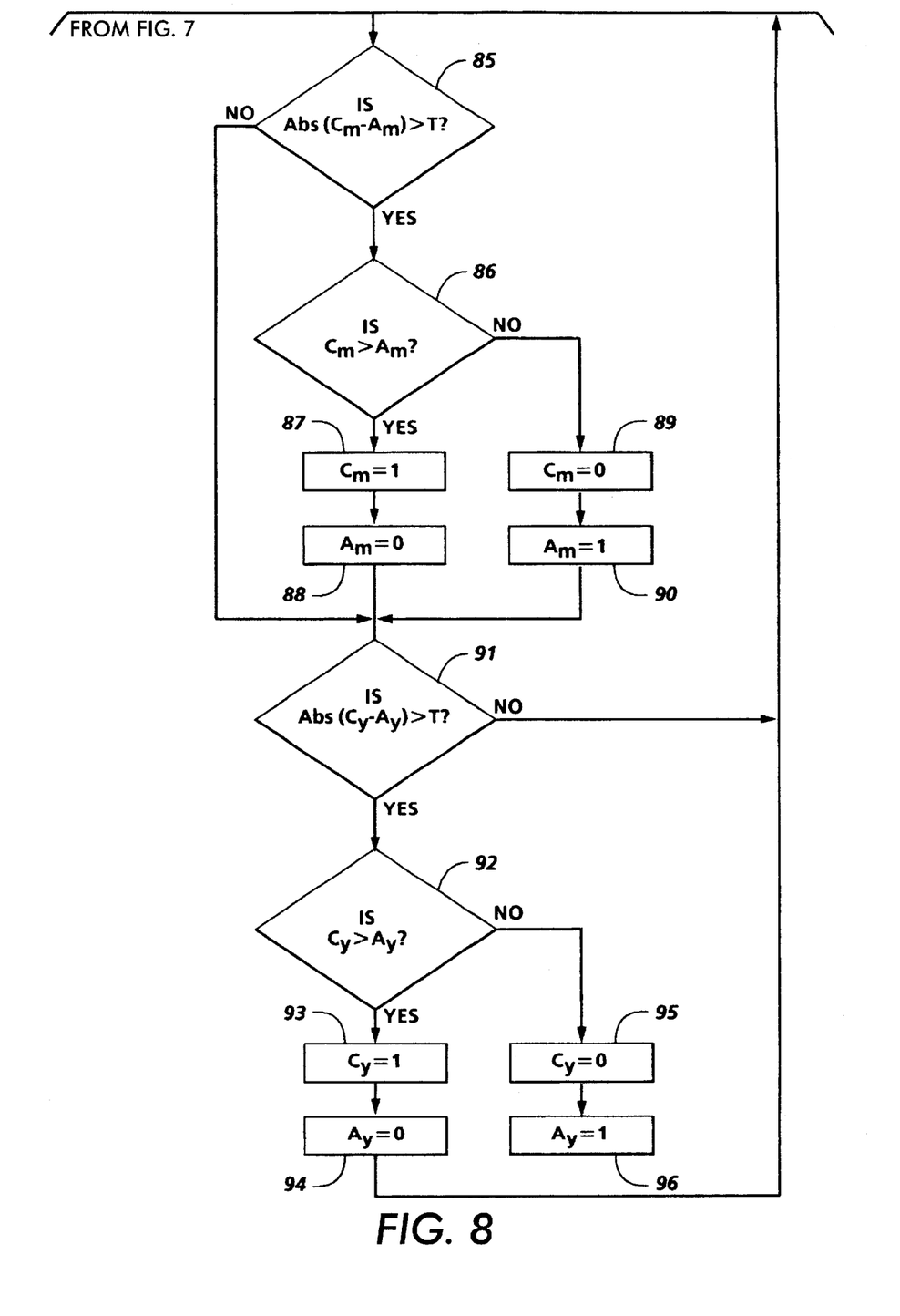

The sequence of steps, shown in FIGS. 7 and 8, are performed by imager 36 when locating and coloring true boundary pixels of an image described using cyan, magenta and yellow colorants (c,m,y). Once the imager 36 has rendered a bytemap of pixels that are tagged with a boundary indicator, imager 36 begins processing the bytemap from left to right and top to bottom at step 71. As indicated by step 71, the first "current pixel" operated on by imager 36 is therefore the upper left most pixel of the bytemap stored in the image buffer. In the following discussion, it is assumed that the current pixel being operated on by imager 36 is surrounded by other pixels, and that it will be readily apparent to those skilled in the art what exceptions must be taken with pixels that are found at the outlying edge of a bytemap.

With reference now to FIGS. 7 and 8, the current pixel (C) is checked for a boundary indicator at step 72. If there is no boundary indicator, and if it was found at step 73 that the current pixel is not the last pixel of the image, then the current pixel is indexed to the subsequent pixel at step 74, and in turn checked for a boundary indicator at step 72. However, when the current pixel C is tagged with a boundary indicator, imager 36 tries to identify a companion pixel (A). A companion pixel (A) is identified, at step 75, by checking if any of the current pixel's neighbors immediately adjacent to it are not tagged with a boundary indicator, and if the adjacent pixel's color does not match the current pixel's color. If all of the neighboring pixels of the current pixel are tagged or match in color with the current pixel then the current pixel is checked to see if it is the last pixel to be evaluated at step 73. If it is the last pixel to be evaluated then the mapping is complete at step 97 for the current image buffer, otherwise the current pixel is indexed to the subsequent pixel at step 74 and checked at step 72 for being tagged with a boundary indicator, as discussed above.

Alternatively, the first neighboring pixel of the current pixel found at step 75 that is not tagged with a boundary indicator and that does not match the current pixel's color (i.e. each (c,m,y) component), is assigned to be the current pixel's companion pixel (A) at step 77. Specifically at step 75, the neighboring left, upper, right and lower adjacent pixel of the current pixels are examined sequentially. As soon as one adjacent pixel is determined not to be tagged with a boundary indicator and determined not to match the color of the current pixel, it is assigned to be the current pixel's companion pixel A (A=Adjacent Pixel), at step 77. The current pixel C and the companion pixel A are then used to determine if the current pixel is a true boundary pixel of the image at steps 79, 85 and 91.

In subsequent steps 79, 85 and 91, the color components, cyan, magenta and yellow, (c,m,y) respectively, of the current (tagged) pixel (C) and its companion pixel (A) (step 75 or 76) are compared. In general, if the absolute value of the difference of the tagged pixel's color components ($C_c$, $C_m$, $C_y$) and its companion pixel's color components ($A_c$, $A_m$, $A_y$) exceeds a threshold value T, then the current pixel (C) is part of a true boundary and undergoes edge enhancement, otherwise the tagged pixel is just an artifact of the image construction and the edge should not be made overtly visible through edge enhancement. Edge enhancement is accomplished, in accordance with the present invention, by measuring the color difference of an image's color components at the boundaries of image elements. Each color separation or component of an image is represented using subtractive (c,m,y) colorants. The color separations or colorants, each of which is considered individually, can range linearly for example between zero and one. Functions depicting each of these colorants, such as cube roots or logs, can be used to make the difference measurement more visually uniform. A difference value is represented herein by the difference between a color separation of the tagged pixel and its companion pixel. If the magnitude of the difference value exceeds a threshold value then the pixel with the smaller color component value is minimized (or set to zero) and the pixel with the larger color component value is maximized (or set to one).

Specifically, at step 79 the absolute value of the difference between the cyan component of the current pixel being evaluated ($C_c$) and the cyan component of the first companion pixel ($A_c$), at steps 75 and 76, that was determined not to be tagged with a boundary indicator is compared with a threshold value (T). If the absolute value of the difference of the two neighboring pixel's cyan components is greater than the threshold value (abs($C_c - A_c$)>T), at step 79, then the cyan components of the two neighboring pixels $C_c$ and $A_c$ are mapped to solid colors. Similarly, the magenta and the yellow color components of each neighboring pixel are checked for a substantial color difference at steps 85 and 91, respectively.

At step 80, the larger of the current pixel's cyan component and its companion pixel's cyan component are determined ($C_c > A_c$). If the current pixel's cyan component is larger than the companion pixel's cyan component, then the current pixel's cyan component is maximized ($C_c$=1) at step 81, and the companion pixel's cyan component is minimized ($A_c$=0) at step 82. Alternatively, if the current pixel's cyan component is less than the companion pixel's cyan component, then the current pixel's cyan component is minimized ($C_c$=0) at step 83 and the companion pixel's cyan component is maximized ($A_c$=1) at step 84. Similar evaluation takes place for the magenta and yellow components of the current pixel ($C_m$ and $C_y$) and its companion pixel ($A_m$ and $A_y$) at steps 85–90 and steps 91–96 respectively. Once the yellow component is evaluated at steps 91–96, after evaluating the magenta component of the current pixel and its companion pixel, the current pixel is checked at step 73 if it is the last pixel of the image to be evaluated. If the current pixel is the last pixel then the imager 36 has completed the mapping of the continuous tone image at step 97.

With reference again to FIG. 6, once the imager 36 has completed mapping the edge boundary pixels of image elements forming the image in its image buffer, the imager then renders the continuous tone image to bits by quantizing the continuous tone pixels to binary pixels or a limited number of levels at step 65. The image now represented using binary colored pixels is then transmitted to marker 29 to be rendered on paper. The mapped colors of the current pixels (C) and their companion pixels (A), defined by the new color components ($C_c$, $C_m$, $C_y$) and ($A_c$, $A_m$, $A_y$), are solid colors when printed on paper, thereby providing image elements (with solid boundaries) that require detail to be preserved when rendered.

It will no doubt be appreciated that in a printing architecture as described above which separates the processing into a page description language decomposition stage (e.g. interpreter 30 and coalesce service 32) and an imaging stage (e.g. imager 36), colors of image elements are usually found at the interface between these two stages. Accordingly, in an alternate embodiment the color mapping may be carried out entirely in the interpreter 30 and coalesce service 32. For example, fonts could be loaded onto printing system 9 that are segregated into an inner area and a boundary area so that two different colors can be specified before coalesed information is passed onto imager 36.

What is required by the present invention, however, is that originally specified colors of edges of image elements, such as text, are mapped to a solid color so that the image elements retain their legibility when printed. However, since this detail color mapping may cause extreme color shifts of image elements, such as small text, the edge color mapping should be reserved for occasions when the legibility of image elements are more important to the user than the true color fidelity of the image elements. Also, invocation of the edge detail color mapping depends upon the interface between the user's application and the printing system. Thus, in alternate embodiments there may exist no a priori way of determining whether or not the color mapping is desirable (e.g. appearance hints), and consequently a printer may be configured such that all color text is edge detail color mapped by default.

It will also no doubt be appreciated that the edge detail mapping method of the present invention is not limited to mapping colors defined using combinations of cyan, magenta and yellow (c,m,y) primaries. Other colors defined using primaries such as red, green and blue (r,g,b) can be readily mapped according to the method disclosed in FIG. 7 simply by taking the compliments of the cyan, magenta and yellow primaries respectively (e.g. c=1−r, m=1−g, y=1−b). Alternatively, it will also be understood that the edge detail color mapping method of the present invention can be used with to preserve detail of colors that are mapped to black-and-white textures.

The disclosed method of detail color mapping may be readily implemented in software using object oriented software development environments that provide portable source code that can be used on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for mapping an original color of an image element boundary, the image element comprising a plurality of pixels, where a subset of the plurality of pixels located around the periphery of the image element form the image element boundary, each pixel in the image element being defined by a plurality of color separations, and where the image element is nominally rendered by a halftoning process so as to represent the image element as a plurality of original color marks spaced apart from one another, wherein the method maps the original color of the image element to a solid color that appears continuous when reproduced, comprising the steps of:

locating a section of the image element boundary that would nominally be rendered by a halftoning process as a plurality of original color marks spaced apart from one another along the boundary;

determining whether the image element boundary section located in said locating step is comprised of true boundary pixels of the color image; and mapping, in response to a determination that the image element boundary section is comprised of true boundary pixels, the color separation of the image element boundary section to produce a solid color along at least the image element boundary section so as to produce a continuous color boundary and to preserve edge detail of the image element being rendered.

2. The method according to claim 1, wherein said determining step determines whether the image element boundary section located in said locating step forms an artifact in the color image if the original color of the boundary section is mapped to a solid color.

3. The method according to claim 1, wherein said determining step comprises the steps of:

locating a companion section adjacent to the image element boundary section and outside the image element boundary section;

calculating a difference value for each color separation defining the boundary section and the companion section; and evaluating whether the difference value for each color separation exceeds a threshold value.

4. The method according to claim 3, further comprising the step of maximizing the larger of each color separation defining the boundary section and minimizing the smaller of each color separation defining the companion section in response to said evaluating step determining that the difference value exceeds the threshold value.

5. The method according to claim 3, further comprising the step of minimizing the smaller of each color separation defining the boundary section and maximizing the larger of each color separation defining the companion section in response said evaluating step determining that the difference value exceeds the threshold value.

6. The method according to claim 1, wherein said mapping step comprises the step of maximizing a color separation of the image element boundary section.

7. The method according to claim 1, further comprising the step of quantizing the color separation of the image element boundary section before reproducing it on a color printer.

8. A method for mapping an original color of an image element boundary, the image element comprising a plurality of pixels, where a subset of the plurality of pixels located around the periphery of the image element form the image element boundary, each pixel in the image element being defined by a plurality of color separations, and where the image element is nominally rendered by a halftoning process so as to represent the image element as a plurality of original color marks spaced apart from one another, wherein the method maps the original color of the image element to a solid color that appears continuous when reproduced, comprising the steps of:

locating a section of the image element boundary that would nominally be rendered by a halftoning process as a plurality of original color marks spaced apart from one another along the boundary and performing said section locating step only for an image element having an item of data defining an appearance hint, the item of data indicating that the original color of an image element can be altered in order that the detail of the image element is preserved when reproduced;

determining whether the image element boundary section located in said locating step is comprised of true boundary pixels of the color image; and mapping, in response to a determination that the image element boundary section is comprised of true boundary pixels, the color separation of the image element boundary section to produce a solid color along at least the image element boundary section so as to produce a continuous color boundary and to preserve edge detail of the image element being rendered.

9. The method according to claim 8, further comprising the step of enabling the appearance hint for an image element from a user interface.

10. A method for mapping original colors of image object boundaries within a color image, each image object comprising a plurality of image elements and each image element comprising a plurality of pixels, where a subset of the plurality of pixels around the periphery of each image element form an image object boundary, each pixel being defined by a plurality of color separations, and where the image object is nominally rendered by a halftoning process so as to represent the image object as a plurality of original color marks spaced apart from one another, wherein the method maps the original color of the pixels forming the image object boundary to solid colors that appear continuous when reproduced, comprising the steps of:

locating a boundary pixel located about the periphery of an image element forming an image object;

locating a companion pixel adjacent to the boundary pixel and outside the image element;

calculating a difference value for each color separation defining the boundary pixel and the companion pixel, wherein the difference value characterizes the difference between a color separation value of the boundary pixel and a color separation value of the companion pixel;

determining whether the difference value for each boundary and companion pixel color separation exceeds a threshold value, said determining step indicating that the boundary pixel and the companion pixel are true boundary pixels of the image object in response to the difference value of a color separation exceeding the threshold value; and maximizing the larger of the color separation values defining the true boundary pixel's.

11. The method according to claim 10, further comprising the step of minimizing the smaller of the color seperations defining the true boundary pixels.

12. The method according to claim 10, further comprising the steps of:

quantizing the color image; and reproducing the quantized color image on a printer.

13. An apparatus for mapping an original color of an image element boundary that appears as a halftone region when reproduced, to a solid color that appears when reproduced, with the original color and the solid color being defined by a plurality of color separations, comprising:

means for locating a section of the image element boundary that nominally appears as a halftone region when reproduced;

means for determining whether the image element boundary section located by said locating means comprises true boundary pixels of the color image; and means, responsive to an image element boundary comprising true boundary pixels as determined by said determining means, for mapping a color separation of the image element boundary section to a solid color along at least the image element boundary section so as to produce a continuous color boundary and to preserve edge detail in the image element being reproduced.

14. The apparatus of claim 13, wherein said determining means comprises:

means for locating a companion section adjacent to the image element boundary section and outside the image element;

means for calculating a difference value for each color separation defining the boundary section and the companion section; and means for evaluating whether the difference value for each color separation exceeds a threshold value.

15. The apparatus of claim 14, further comprising means for maximizing the larger of each color separation defining the boundary section and minimizing the smaller of each color separation defining the companion section in response said evaluating means determining that the difference value exceeds the threshold value.

16. The apparatus of claim 14, further comprising means for minimizing the smaller of each color separation defining the boundary section and maximizing the larger of each color separation defining the companion section in response said evaluating means determining that the difference value exceeds the threshold value.

17. The apparatus of claim 13, wherein said mapping means comprises means of maximizing a color separation of the image element boundary section.

18. The apparatus of claim 13, further comprising means for quantizing the color separation of the image element boundary section before reproducing the color image.

19. The apparatus of claim 17, further comprising a color printer for reproducing the color image.

20. The apparatus of claim 13, further comprising means for inputting an item of data defining an appearance hint for each image element, said item of data indicating that a color of an element should be mapped according to said maximizing means.

21. The apparatus of claim 20, wherein said inputting means comprises a user interface.

* * * * *